Patented Oct. 10, 1950

2,525,319

UNITED STATES PATENT OFFICE 2,525,319

HYDROXYSULFONAMIDOTHIAZOLES AND PREPARATION OF THE SAME

Yellapragada SubbaRow, Pearl River, N. Y., and Martin E. Hultquist, Bound Brook, N. J.; Aloysius J. Bryant administrator of said SubbaRow, deceased, assignors to American Cyanamid Company, New York, N. Y., a corporation of Maine No Drawing. Application July 7, 1948, Serial No. 37,504

6 Claims. (Cl. 260—302)

This invention relates to new organic compounds and to methods of preparing the same.

This application is a continuation-in-part of application Serial Number 25,524, filed May 6, 1948, entitled Hydroxysulfonamides and Preparation of the Same.

The new compounds of the present invention may be represented by the general formula:

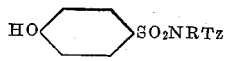

in which Tz represents a thiazolyl radical and R represents hydrogen or an aliphatic, aralkyl, or heterocyclic radical attached to the amide nitrogen atom. The thiazolyl radical may be attached to the amide nitrogen at any of the 2, 4, or 5 positions on the thiazolyl ring. The thiazolyl radical may also bear one or more substituent radicals such as alkyl, alkoxy, hydroxyalkyl, carboxy, halo, carbalkoxy, amino and the like.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is effected thereby, usually increased. Obviously, such salts are included within the scope of the present invention.

As will be observed, the new compounds are somewhat related structurally to the well known sulfanilamidothiazoles differing thereover in having a hydroxy group at the para position of the benzene ring instead of an amino group. Although the sulfanilamidothiazoles are effective in inhibiting the growth of pathogenic bacteria, they have little or no activity against viruses and cannot be used in the treatment of viral diseases. On the other hand, compounds of the present invention are relatively inactive against bacteria but are effective in the treatment of diseases caused by viruses, particularly poliomyelitis.

The new p-hydroxybenzenesulfonamidothiazoles may be prepared by several distinct methods, the more important of which will be described in the specific examples which follow. The preferred method is by the hydrolysis of a suitable ester of a p-hydroxybenzenesulfonamidothiazole under either acidic or alkaline conditions whereby the —OH group is formed in the reaction. Examples of this hydrolysis will be given hereinafter.

To prepare compounds suitable for hydrolysis to yield the new compounds of the present invention several methods are available. A preferred method involves the condensation of an appropriate benzene sulfonyl halide with an aminothiazole in accordance with the following equation:

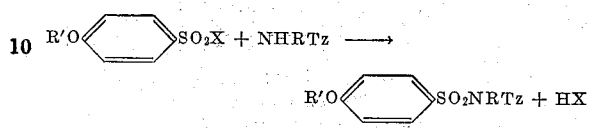

In the above R' is an acyl radical such as benzoyl, acetyl, furoyl, tosyl, carbethoxy or the like which may later be removed by hydrolysis. X is a halogen, preferably chlorine, but if desired fluorine, bromine or iodine. Tz is a thiazolyl radical such as mentioned above in which the amino group is attached to a carbon atom in the thiazole ring.

To prepare intermediates in which R is an organic radical of the kind mentioned above, secondary amines such as 2-N-(beta-hydroxy ethyl)-amino-thiazole, 2-(N-methyl amino)-benzothiazole and the like are employed in the reaction.

A preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or an organic solvent containing a basic compound such as sodium carbonate or trimethylamine as acid acceptor or an aqueous solution containing a substance which will react with the hydrohalide acid formed during the reaction and prevent it from interfering with the reaction.

Hydrolysis of the resulting compounds to convert the group RO— to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and a slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxide, ammonia and the like may also be used. Conversion of the group RO— to HO— can also be effected by hydrolysis under acidic conditions using hydrochloric acid, sulfuric acid, or other known acid hydrolyzing agents.

The time for completion of the hydrolysis depends on several factors including the temperature, the concentration of the hydrolyzing agent, the nature of the compounds etc. Using, for example, sodium hydroxide at 10% concentration and at a temperature of 75° to 95° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-amino-benzenesulfonamidothiazoles. This process involves diazotization of the p-amino-group on the benzene ring followed by decomposition of the diazo compound under carefully controlled conditions so that a hydroxy group is formed. Several examples of this procedure are shown in the specific examples. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of representative p-hydroxybenzenesulfonamidothiazoles in the following examples. All parts are by weight unless otherwise indicated.

Example 1

Sulfathiazole (127.5 parts, or 0.5 mole) is dissolved in 2,000 parts water and 185 parts 95% sulfuric acid. Ice is added to bring the temperature of the solution to 5°–10° C., and then a solution of 35 parts sodium nitrite in 200 parts water while adding ice as necessary to maintain the temperature of the reaction mixture at 5°–10° C.

The resulting slurry of orange-yellow crystals is then heated as rapidly as possible to 90°–95° C. and held at this temperature for one-half hour to decompose the diazonium salt. The hot solution is separated from some dark, tarry insoluble material, and the crude N-(2-thiazolyl)-1-phenol-4-sulfonamide crystallizes on cooling.

After filtration, the product is purified by dissolving in 300 parts water and 50 parts sodium hydroxide, and adding 50 parts sodium chloride to salt out the disodium derivative. This disodium salt is filtered off and redissolved in 2,000 parts water at 80°–90° C., 36% hydrochloric acid is added to about pH 7, ten parts activated charcoal is added, and the solution is clarified at 80°–90° C. after 15 minutes. The product is then precipitated by addition of hydrochloric acid to pH 3–4 and cooling to 20° C. After filtering and drying, there is obtained 32 parts very faintly yellowish crystalline N-(2-thiazolyl)-1-phenol-4-sulfonamide melting at 229°–230.5° C.

| Analysis | C | H | N | S |
| --- | --- | --- | --- | --- |
| Calc. for $C_9H_8N_2S_2O_3$ | 42.17 | 3.14 | 10.93 | 25.02 |
| Found | 42.1 | 3.23 | 11.1 | 25.4 |

Example 2

10 parts of 2-aminothiazole is mixed with 68.5 parts of pyridine and 30 parts of 1-benzoyloxybenzene-4-sulfonyl chloride. After the exothermic reaction which takes place is over, the mixture is heated for 15 minutes at 50°–60° C. and then cooled and diluted with 200 parts of water. The slurry obtained is acidified to about pH 3.5 with hydrochloric acid. A gum forms, which is filtered off and then added to a mixture of 55 cc. of water and 20 cc. of 50% sodium hydroxide. The gum goes into solution on heating for ½ hour at 85°–95° C. The caustic solution is filtered, treated with activated carbon and again filtered. The clear solution obtained is acidified to about pH 3.5 with hydrochloric acid. A white product crystallizes out after acidification and cooling (10° C.). The product is filtered off, washed with water and sucked dry. The filter cake is slurried with an aqueous sodium bicarbonate solution to remove any benzoic acid present. The product which does not go into solution is filtered off and washed with a sodium bicarbonate-water solution and then with water. The filter cake is sucked as dry as possible and then dissolved in hot absolute ethanol. The alcohol solution is treated with activated carbon, filtered and cooled to 10° C. The crystalline precipitate obtained is filtered off, washed with water and dried. The product obtained melts at 227.5°–228.5° C. and does not depress the melting point of a known sample of N-(2-thiazolyl)-1-phenol-4-sulfonamide.

Example 3

To a mixture of 150 parts dry pyridine and 71 parts 2-aminothiazole is added 150 parts 1-carbethoxyoxybenzene-4-sulfonyl chloride, keeping temperature at 50°–55° C. After 15 minutes at 50°–55° C., the reaction is heated for ½ hour at 65°–70° C. There is then added 600 parts water and sufficient 36% hydrochloric acid to bring the pH to about 4. The crystallized product is separated by filtration and purified by recrystallization from ethyl alcohol to give N-(2-thiazolyl)-1-carbethoxyoxybenzene-4-sulfonamide, practically colorless crystals melting at 155.6°–156.5° C.

A solution of 12 parts N-(2-thiazolyl)-1-carbethoxyoxybenzene-4-sulfonamide in 52 parts water and 12 parts sodium hydroxide is heated to 85°–95° C. for ½ hour. 36% hydrochloric acid is added to bring the pH to about 4. The reaction mixture is cooled to 10°–15° C., and the crystallized product is separated by filtration. The product is purified by recrystallization from water to give N-(2-thiazolyl)-1-phenol-4-sulfonamide as practically colorless crystals melting at 229.0°–230.1° C.

Example 4

To a mixture of 166 parts 2-amino-5-carbethoxythiazole and 200 parts dry pyridine is added 200 parts 1-carbethoxyoxybenzene-4-sulfonyl chloride, and the temperature of the mixture brought to and maintained at 65°–70° C. for 30 minutes. There is then added 800 parts hot water and concentrated hydrochloric acid until the pH is 3–4. On standing, the gummy precipitate becomes partly crystalline.

This partly crystalline product is separated and is dissolved in 900 parts water and 166 parts sodium hydroxide. This reaction mixture is heated to 90°–95° C. for 1 hour and after filtration to remove some insoluble impurities, the solution is acidified to about pH 2–3 to precipitate the product.

After recrystallization three times from about 150 part portions of anhydrous ethyl alcohol, there is obtained 11.5 g. N-(5-carboxy-2-thiazolyl)-1-phenol-4-sulfonamide melting at 212.5°–213.9° C.

| Analysis | C | H | N | S |
|---|---|---|---|---|
| Calc. for $C_{10}H_8N_2S_2O_5$ | 39.99 | 2.68 | 9.33 | 21.35 |
| Found | 39.9 | 2.82 | 9.43 | 21.2 |

*Example 5*

2.2 parts of N-(2-thiazolyl)-1-carbethoxyoxybenzene-4-sulfonamide is slurried in 88 parts of 20% sulfuric acid. The mixture is heated at 110° C. for 45 minutes during which time complete solution takes place. The solution is treated with 1 part of activated carbon at 100° C. and is again filtered. The clear filtrate is cooled to 5° C., and the white crystalline product obtained is collected on the filter and washed free of acid, and dried at 100° C. 1 part of product is obtained which is twice recrystallized from ethanol. The product is washed and dried at 100° C. It shows no depression in a mixture melting point with a known sample of N-(2-thiazolyl)-1-phenol-4-sulfonamide.

*Example 6*

Sixty parts of 2-amino-4-methylthiazole (Organic Synthesis, vol. II, page 31, B. P. 113°/6.5 mm.) is dissolved in 250 parts of an anhydrous pyridine-picoline mixture. To this solution there is added in small portions over a period of 1½ hours 185 parts of 4-tosyloxybenzenesulfonyl chloride (M. P. 80–82°) during constant stirring. The dark reaction mixture is then heated for 1 hour at 80 to 85° and while still warm is poured into 2500 parts of 1 N hydrochloric acid. A dark gum separates at first but this hardens into lumps after being stirred for a short time. The lumps are broken up, filtered off and washed well with water. This crude intermediate compound is hydrolyzed without further purification by boiling with 2000 parts of 8% sodium hydroxide solution for one hour.

The resulting dark solution is partially decolorized by treating it with small quantities of sodium hydrosulfite and decolorizing carbon and the crude product is isolated by the addition of dilute hydrochloric acid to pH of about 1.0. On standing a pale yellow crystalline precipitate forms which is filtered off washed with water and dried. This material is purified by several times crystallizing the sodium salt from concentrated aqueous solution by the addition of excess caustic and finally precipitating it from a hot, dilute solution by the addition of dilute acetic acid. The pure N-(4-methyl-2-thiazolyl)-1-phenol-4-sulfonamide is obtained in the form of shiny white, small plates having a melting range of 209.5°–210.5° C.

| Analysis | C | H | N | S |
|---|---|---|---|---|
| Calc. for $C_{10}H_{10}N_2O_3S_2$ | 44.5 | 3.70 | 10.38 | 23.7 |
| Found | 44.5 | 3.81 | 10.4 | 23.8 |

The 4-tosyloxybenzenesulfonyl chloride used above is a new compound which may be prepared as follows:

One hundred parts of phosphorous pentachloride and 92 parts of the sodium salt of 1-(p-toluenesulfonyloxy)-benzene-4-sulfonic acid are heated together with stirring on a steam bath for one hour. The resulting thin syrup is cooled and then poured onto 500 parts of flake ice. The crude product separates as white granular lumps and after the ice is melted these are filtered off, broken up, washed with cold water and dried at 40° C. The yield is 73 parts. The crude material is purified by recrystallizing it from a mixture of carbon tetrachloride and petroleum ether from which it separates as white granular crystals which have a melting range of 82.5°–83.5° C.

*Example 7*

Eighty-eight parts of 2-amino-4-phenylthiazole (Dodson and King J. A. C. S. 67, 2242, M. P. 148–150.5) is dissolved in 250 parts of an anhydrous mixture of pyridine and picoline. To this solution, 175 parts of 4-tosyloxybenzene sulfonyl chloride (M. P. 80–82°) is added in small portions over a period of one hour during stirring. The mixture is then heated for one hour on the steam bath and poured into 2500 parts of 1 N hydrochloric acid whereupon a dark gum separates. The acidic water is decanted from the gum, replaced with an equal volume of water and the whole heated on a steam bath until the gum crystallizes. The solid is filtered off, the lumps broken up and washed well with water. This crude intermediate compound is hydrolyzed without further purification by boiling it with 2000 parts of 8% sodium hydroxide solution for one hour.

The resulting dark solution is partially decolorized by treating it with small quantities of sodium hydrosulfite and decolorizing carbon and the crude product is isolated by the addition of dilute hydrochloric acid to a pH of about 1.0. The precipitate which forms is filtered off, washed well with water and dried. This material is purified by twice crystallizing the sodium salt from concentrated aqueous solution by the addition of excess sodium hydroxide and saturating with sodium chloride. The product is finally isolated by acidifying a hot dilute aqueous solution of the sodium salt with dilute hydrochloric acid. The pure N-(4-phenyl-2-thiazolyl)-1-phenol-4-sulfonamide is obtained in the form of small, shiny white plates having a melting range of 250° to 251° C.

| Analysis | C | H | N | S |
|---|---|---|---|---|
| Calc. for $C_{15}H_{12}N_2O_3S_2$ | 54.2 | 3.63 | 8.44 | 19.28 |
| Found | 54.1 | 3.54 | 8.53 | 19.4 |

*Example 8*

53 parts of 2-aminobenzothiazole is dissolved in 49 parts of a 30% picoline in pyridine mixture. 116 parts of tosyloxybenzenesulfonyl chloride is added gradually with stirring while keeping the temperature below 30° C. The mixture is allowed to stand for eight hours at 20-30° C. and 250 parts of water is then added with stirring and the mixture heated to 95 to 100° C. for 1 hour. The mixture is cooled to 10° C. and the crude product is filtered off. It is dissolved in 548 parts of 10% aqueous sodium hydroxide and the slurry is heated to 95-100° C. for 1½ hours. The resulting solution is treated with 13 parts of activated carbon, and filtered, and the filtrate is acidified with hydrochloric acid to a pH of 3. The crystalline product is filtered off, washed with water, and sucked dry. It is slurried in water and sufficient 10% sodium hydroxide solution is added to cause solution. This solution is treated with 13 parts of activated carbon, filtered and the filtrate acidified to a pH of 3. The white product which is obtained is dried at 110° C. It has a melting point of 297.0-300.0° C.

| Analysis | C | H | N | S |
|---|---|---|---|---|
| Calc. for $C_{13}H_{10}N_2O_3S_2$ | 50.96 | 3.29 | 9.145 | 20.935 |
| Found | 51.1 | 3.20 | 9.12 | 20.8 |

We claim:
1. Compounds having the general formula

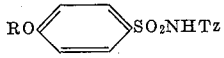

in which R is a member of the group consisting of hydrogen and acyl radicals and Tz is a thiazolyl radical, and the salts of said compounds.

2. Compounds having the general formula

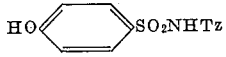

in which Tz is a thiazolyl radical.

3. N-(2-thiazolyl)-1-phenol-4-sulfonamide.
4. N-(4-methyl-2-thiazolyl)-1-phenol-4-sulfonamide.
5. N-(4-phenyl-2-thiazolyl)-1-phenol-4-sulfonamide.
6. A method of preparing compounds having the general formula

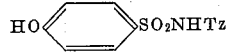

in which Tz is a thiazolyl radical, which comprises treating a p-aminobenzenesulfonamidothiazole with nitrous acid whereby the amino radical is diazotized, and thereafter decomposing the diazo group to obtain a hydroxy radical, and thereafter recovering the said product.

YELLAPRAGADA SUBBAROW.
MARTIN E. HULTQUIST.

REFERENCES CITED

The following references are of record in the file of this patent:

UNITED STATES PATENTS

| Number | Name | Date |
|---|---|---|
| 2,339,083 | Leitch | Jan. 11, 1944 |

OTHER REFERENCES

Billon: Biologie Medicale, vol. 27, Supp. 1937, p. 84.

Kermack: Jr. Chem. Society (London), 1939, pp. 608-609.